US005427690A

United States Patent [19]

Rowe et al.

[11] Patent Number: 5,427,690
[45] Date of Patent: Jun. 27, 1995

[54] αOLEFIN/MALEIC ANHYDRIDE COPOLYMERS AS ANTIFOULANTS IN QUENCH WATER SYSTEMS

[75] Inventors: Carl T. Rowe, Missouri City; Sherri L. Fisher, Sugar Land, both of Tex.

[73] Assignee: Nalco Chemical Company, Naperville, Ill.

[21] Appl. No.: 194,758

[22] Filed: Feb. 10, 1994

[51] Int. Cl.[6] .................... C02F 5/10

[52] U.S. Cl. .................... 210/698; 210/708; 208/48 AA; 585/950

[58] Field of Search .................... 203/6, 8, 9; 210/698–701, 708; 524/55; 208/48 AA, 48 Q; 585/950

[56] References Cited

U.S. PATENT DOCUMENTS

| | | | |
|---|---|---|---|
| 2,737,452 | 3/1956 | Catlin | 44/62 |
| 3,231,458 | 1/1966 | Lawson | 161/162 |
| 3,531,440 | 9/1970 | Mehmedbasich et al. | 260/78.4 |
| 3,554,897 | 1/1971 | Stanley | 208/48 |
| 3,560,456 | 2/1971 | Hazen et al. | 260/78.5 |
| 3,694,176 | 9/1972 | Miller | 44/62 |
| 4,105,540 | 8/1978 | Weinland | 203/6 |
| 4,151,069 | 4/1979 | Rossi | 208/33 |
| 4,240,916 | 12/1980 | Rossi | 252/568 |
| 4,548,725 | 10/1985 | Beidger | 252/56 R |
| 4,780,499 | 10/1988 | Villarreal et al. | 524/259 |
| 4,866,135 | 9/1989 | Gutierrez et al. | 525/285 |
| 4,919,683 | 4/1990 | Nalesnik et al. | 144/347 |
| 5,221,461 | 6/1993 | Henrici et al. | 252/404 |
| 5,232,963 | 8/1993 | Comer et al. | 524/55 |
| 5,294,347 | 3/1994 | Byrne et al. | 210/708 |
| 5,332,491 | 7/1994 | Fisher et al. | 208/48 AA |

*Primary Examiner*—Peter A. Hruskoci
*Attorney, Agent, or Firm*—Robert A. Miller; James J. Drake

[57] ABSTRACT

A method for dispersing heavy hydrocarbons in an ethylene water quench tower, the method comprising the steps of: introducing an effective amount of a dispersant into the ethylene water quench tower, the dispersant comprising a copolymer of an α-olefin having from about 10 to about 36 carbon atoms and a maleic anhydride, wherein the rate ratio of the α-olefin to the maleic anhydride is from about 1:1 to about 5:5 and the molecular weight of the copolymer is from about 5,000 to about 100,000, the anhydride moieties of the copolymer being substantially intact.

6 Claims, No Drawings 

αOLEFIN/MALEIC ANHYDRIDE COPOLYMERS AS ANTIFOULANTS IN QUENCH WATER SYSTEMS

FIELD OF THE INVENTION

The present invention relates to dispersing high molecular weight hydrocarbon materials present in an ethylene water quench tower with α-olefin/maleic anhydride copolymer additives.

BACKGROUND OF THE INVENTION

In ethylene manufacturing plants, cracked gases are quenched with water in the quench tower. The gas is quenched to condense steam and heavy hydrocarbons, cool the gases prior to compression, and stop unwanted polymerization reactions. The hydrocarbons are separated from the water by an oil/water separator unit located after the quench tower. The hydrocarbons can deposit and adhere to the trays, packing, interior of quench system coolers, other tower internals, and the oil/water separator. This is referred to as fouling.

Fouling may occur by deposition of corrosion products and by the formation of polymeric material. Polymers can result from the reaction of organic compounds in the pyrolysis gasoline with oxygen. Fouling will result in reduction of heat removed from the process. Fouling can lead to plugging of trays or packing, resulting in reduced liquid-gas contact, increased top temperature and pressure differential, and finally in flooding of the tower. An increased top temperature of the quench water tower will result in a larger volume of cracked gas to compress. This may act to restrict the throughput, but in any case, it increases the energy consumption by the cracked gas compressors.

Polymers comprising α-olefins and maleic anhydride are well known, Rossi U.S. Pat. No. 4,240,916 discloses an oil soluble copolymer composed of about equimolar amounts of 1-olefins and maleic anhydride useful as a lubricating oil pour point depressant wherein the 1-olefins are a mixture of $C_1$–$C_{14}$ and $C_{20}$–$C_{28}$ monomers. The pour point depressant activity is said to be enhanced by esterification of the copolymer with a $C_1$–$C_4$ alcohol.

Rossi U.S. Pat. No. 4,15 1,069 discloses olefin-dicarboxylic anhydride copolymers and their ester derivatives having $C_{18}$–$C_{50}$ linear alkyl side chains. The polymers and derivatives are said to be useful in amounts of up to 5 weight percent as filtration aids in low-temperature solvent dewaxing of waxy lubricating oils containing 5–30 weight percent wax.

Similarly, Miller U.S. Pat. No. 3,694,176, discloses polymers of ethylene and ethylenically unsaturated dicarboxylic acids, anhydrides or esters as wax crystal modifiers, pour point depressants and dewaxing aids in petroleum oil.

Rossi U.S. patent applications, Ser. No. 5,15,562, filed Oct. 17, 1974, abandoned, discloses that partial alkyl ester-partial amide derivatives of low molecular weight maleic anhydride/1-olefin copolymers are useful in mineral oil lubricants as pour point depressants, viscosity index improvers and sludge inhibitors.

Japanese Kokai 62-018,494 discloses low temperature flow improvers for fuel oils which are copolymers of a $C_{20}$–$C_{28}$ α-olefins and maleic anhydride.

Hazan et al. U.S. Pat. No. 3,560,456 discloses a process for making a copolymer of maleic anhydride and an aliphatic olefin having from 16–18 carbon atoms in the presence of a free radical catalyst and a solvent. The copolymer is precipitated from solution using n-propanol or isopropanol.

de Vries U.S. Pat. No. 3,231,458 discloses a high molecular weight copolymer of olefins of from about 2 to about 20 carbon atoms and diolefins of from about 5 to about 20 carbon atoms reacted with maleic anhydride to form a succinic anhydride-substituted adduct said to have rust inhibiting, dispersing and thickening characteristics in liquid hydrocarbon compositions, such as fuels and lubricants.

Nalesik, et al. U.S. Pat. No. 4,919,683 discloses a stabilizer for a middle distillate fuel-oil which is an aromatic polyamine succinimide derivative of an ethylene/$C_3$–$C_{18}$ α-olefin copolymer grafted with maleic anhydride.

Gutierrez et al. U.S. Pat. No. 4,866,135 discloses a reaction product of a $C_5$–$C_9$ lactone adduct of a maleic anhydride grafted ethylene/$C_3$–$C_{28}$ α-olefin polymer with an N-containing heterocyclic aminoalkyl derivative. The polymeric lactone derivatives are said to be useful as dispersant additive for fuel and lubricating oils.

Bridger U.S. Pat. No. 4,548,725 discloses a lubricant additive said to reduce low temperature microcrystalline wax formation in hydro-dewaxed stock made by reacting an alcohol with a maleic anhydride-olefin copolymer.

Mehmedbasich et al. U.S. Pat. No. 3,531,440 discloses succinate ester modified polymers of $C_6$–$C_{18}$ α-olefins employed as dispersants in fuels.

SUMMARY OF THE INVENTION

The invention provides a method for dispersing heavy hydrocarbons in an ethylene water quench tower. The method includes the steps of introducing an effective amount of a dispersant into the ethylene water quench tower. The dispersant comprises a copolymer of an α-olefin having from about 10 to about 36 carbon atoms and maleic anhydride. The weight ratio of the α-olefin to the maleic anhydride is preferably from about 1:1 to about 1:5. The molecular weight of the copolymer is preferably from about 5,000 to about 100,000. The maleic anhydride moieties of the copolymer are substantially intact.

DETAILED DESCRIPTION OF THE INVENTION

The dispersant of the present invention includes a polymerized copolymer of an α-olefin and maleic anhydride. The anhydride moieties along the polymer backbone are preferably substantially intact and not converted into a di-acid or any other anhydride reaction products. Preferably, olefin monomers have from about 10 to about 36 carbon atoms. More preferably, the olefin monomers have from about 18 to about 28 carbon atoms; and, most preferably, from 24 to about 28 carbon atoms. Accordingly, to one embodiment of the invention, the α-olefins is selected from the group consisting of 1-tetradecene, 1-hexadecene, 1-octadecene, 1-eicosene, 1-docosene, 1-tetracosene, 1-heptacosene, 1-triacontene and 1-hexatriacontene.

The maleic anhydride monomer is a preferably α-β-ethylenically unsaturated anhydride. The maleic anhydride should preferably be essentially free of maleic acid contamination.

Preferably, the copolymer dispersant of the present invention has a molar ratio of α-olefin to maleic anhydride of from about 1 to 5, preferably from about 1 to 2, and most preferably 1 to 1.5. Copolymers typically have a molecular weight from about 5,000 to about 100,000, preferably from 5,000 to about 25,000, and more preferably from about 5,000 to about 15,000. The copolymer dispersant is preferably substantially free of hydrolyzed anhydride moieties or an other anhydride reaction products.

The present dispersant is typically added to the ethylene quench tower via the quench water return. The present dispersant can be used as a continuous additive in quench tower or can be added periodically. Dispersions of the polymeric fouling materials in the quench tower are produced by adding an effective amount of the copolymer dispersant into the quench tower. The dispersant is effective at dispersing polymeric material so as to prevent or inhibit build-up of polymeric material in the tower. The invention maintains throughput and increases run length. The dispersant is preferably used in a concentration of from about 0.1 to about 2,000 parts per million of the quench tower stream, preferably from about 0.5 to about 1,000 parts per million, more preferably from about 1 to about 25 parts per million, and especially from about 1 to about 5 parts per million. Dispersions may be achieved at a stream temperature as low as about 0° C. up to about 500° C., but preferably from about 10° C. to about 400° C.

The following prophetic example is presented to describe preferred embodiments and utilities of the invention and is not meant to limit the invention unless otherwise stated in the claims appended hereto.

EXAMPLE 1

The invention would work as follows: The alpha-olefin/maleic anhydride copolymer antifoulant suitable for use in the present invention has an alpha-olefin moiety of from about 10 to 36 carbon atoms, preferably from about 18 to about 28 carbon atoms, and most preferably from 24 to about 28 carbon atoms. The antifoulant would normally be added to the tower via the quench water return at a concentration of about 0.5 to 1,000 parts per million, and more preferably from 1 to 25 parts per million. Emulsified water can lead to polymeric fouling and deposition. The present invention would prevent the emulsified oil, free oil, and oil-bound particulates from adhering from the tower internals and various heat exchangers. The invention would keep the oil(s) dispersed until such time in the system that the oil can separate from the water, usually in the oil/water separator. This invention offers the significant advantage of not contributing to or forming emulsions in the water. This is due to the polymeric nature of the antifoulant as opposed to the adduct type of dispersants.

Changes can be made in the composition, operation and arrangement of the method of the present invention described herein without departing from the concept and scope of the invention as defined in the following claims:

We claim:

1. A method for dispersing polymeric foulants in an ethylene water quench tower, wherein cracked gases are quenched with water to condense steam and hydrocarbons, the hydrocarbons are separated from the water by an oil water separator unit, and the water is returned to the tower by a quench water return line, the method comprising the step of: introducing an effective amount of a dispersant into the quench water return line, the dispersant comprising a copolymer of an $\alpha$-olefin having from about 10 to about 36 carbon atoms and a maleic anhydride wherein the weight ratio of the $\alpha$-olefin to the maleic anhydride is from about 1:1 to about 1:5, and the copolymer has a molecular weight of from about 5,000 to about 100,000, to disperse said polymeric foulants and prevent deposition of said polymeric foulants in said quench tower.

2. The method of claim 1 wherein the dispersant copolymer is substantially free of hydrolyzed anhydride moieties.

3. The method of claim 1 wherein the effective amount of the dispersant is from about 0.5 to about 1,000 parts per million.

4. The method of claim 1 wherein the $\alpha$-olefin includes from about 24 to about 28 carbon atoms.

5. The method of claim 1 wherein the weight ratio of the $\alpha$-olefin to the maleic anhydride is from about 1:1 to about 1:2.

6. The method of claim 1 wherein the copolymer molecular weight is from about 5,000 to about 15,000.

* * * * *